United States Patent [19]
Woodruff

[11] 3,912,254
[45] Oct. 14, 1975

[54] VENEER SORTER AND STACKER
[75] Inventor: Curtis H. Woodruff, Eugene, Oreg.
[73] Assignee: Cabax Mills, Eugene, Oreg.
[22] Filed: Jan. 7, 1974
[21] Appl. No.: 431,147

Related U.S. Application Data
[62] Division of Ser. No. 374,095, June 27, 1973, Pat. No. 3,812,964.

[52] U.S. Cl. ............... 271/64; 271/189; 271/217; 198/35; 214/6 H
[51] Int. Cl.² ...................................... B65H 29/58
[58] Field of Search....... 271/64, 189, 192, 217–219; 214/6 R, 6 D, 6 DK, 6 F, 6 H; 198/35; 187/6

[56] References Cited
UNITED STATES PATENTS

| | | | |
|---|---|---|---|
| 484,260 | 10/1892 | Sullivan | 187/6 |
| 2,673,735 | 3/1954 | Niles et al. | 271/64 |
| 2,895,624 | 7/1959 | Oster | 214/6 H |
| 3,430,784 | 3/1969 | Hall | 214/6 DK |
| 3,545,744 | 12/1970 | Herman | 271/64 |
| 3,675,791 | 7/1972 | Russell et al. | 271/192 |

Primary Examiner—Evon C. Blunk
Assistant Examiner—Joseph E. Valenza
Attorney, Agent, or Firm—Klarquist, Sparkman, Campbell, Leigh, Hall & Whinston

[57] ABSTRACT

A veneer sorting and stacking machine includes photoelectric apparatus for detecting veneer sheets of greater than a preselected minimum width and an endless belt tipple which elevates to transport sheets of the minimum width into the machine. Moisture detecting means determine if individual sheets are wet or dry. An overhead ribbed belt frictionally engages the top sides of the veneer sheets and transports them along the machine on a pair of guide rails faced with low friction polymer material. Depending on the moisture determination, a given sheet is transported to a selected stacking station where rotatable gates divert it into one of a pair of bins at the station. Each stacking station includes a stacking hoist including pairs of hoist arms disposed in each bin and interconnected by chains for vertical movement with respect to a support. The chains operate to insure that as the hoist arms lower in one bin, those in the other bin are raised. The hoists are gravity operated solely by the weight of the veneer sheets stacked thereon and each hoist includes an air brake for selectively adjusting movement thereof. Electrical circuitry is provided to select the appropriate gate according to the moisture characteristic detected by the moisture detecting apparatus. Such circuitry further reverses the operation of the stacking hoists at each stacking station as a given bin is filled and causes the appropriate gate to close and the gate at the other bin correspondingly to open. Means are also provided automatically to remove the stack of sheets as soon as a bin is filled.

4 Claims, 9 Drawing Figures

VENEER SORTER AND STACKER

This is a continuation of application Ser. No. 374,095, filed June 27, 1973, now U.S. Pat. No. 3,812,964.

BACKGROUND OF THE INVENTION

This invention relates to a machine for sorting and stacking wood veneer sheets. Such sheets typically are formed from logs by a lathe and then are chopped into desired widths. One to the irregularity of size and consistency of the logs, the process generates, in addition to correctly sized sheets, a variety of scrap pieces. This scrap must be removed before the remaining sheets are further processed. The veneer sheets can then be sorted according to a given characteristic, such as whether they are heart or sap, that is dry or wet. Where the sheets have been previously dried, they may be sorted according to quality grades.

Although various sorting machines have been developed for lumber, wood panels and other related products, prior to the present invention sorting of veneer sheets has been accomplished primarily by manual labor. Examples of prior machines include those disclosed in the following U.S. patents: Oster, U.S. Pat. No. 2,895,624; Geisler, U.S. Pat. No. 3,007,585; Hall, U.S. Pat. No. 3,430,784; and Faley, U.S. Pat. No. 3,717,249. Oster patent, U.S. Pat. No. 2,895,624, discloses an elevator for a lumber stacker which is adapted to receive lumber on arms arranged in pairs such that as one set is lowered by a motorized hoist, a corresponding set, linked by a chain mechanism, is raised.

Geisler patent, U.S. Pat. No. 3,007,585, relates to a pallet loading machine and employs a gravity lowering hoist wherein counterweights are used to maintain the hoist at appropriate levels during the stacking procedure. Hall patent, U.S. Pat. No. 3,430,784, discloses a stacker for sorting panels including the provision of drop arms for the stacking bins. Finally, Faley patent, U.S. Pat. No. 3,717,249, discloses a sorter and stacker for veneer employing a vacuum conveying system to transport the sheets.

The primary object of the present invention is to provide a sorter and stacker which is capable of continuously sorting veneer sheets according to a given characteristic and then stacking such sheets at a substantial rate of speed.

It is another object of the present invention to provide a machine employing a stacking hoist which is gravity operated to obtain simplified and reliable operation of the hoist.

It is a further object of the present invention to provide a machine which accurately deposits the veneer sheets into stacking bins such that no side or end straightening of the veneer stack is necessary during or subsequent to the stacking process.

It is a still further object to provide a machine which is automatically capable of rejecting veneer sheets of less than a minimum width, while accepting for subsequent sorting and stacking sheets of such minimum width or greater.

It is another object of the present invention to provide a sorting and stacking machine which can detect one or more physical characteristics of veneer sheets as they pass into the machine and automatically stack them according to the detected characteristic.

It is yet another object of the present invention to provide a stacking machine which is capable of automatically detecting and removing a full stack of veneer sheets once they have been stacked as aforesaid.

It is another object of the present invention to provide a machine having an electrical relay memory which can accurately detect the progress of veneer sheet through the machine properly to route the sheet regardless of the machine speed or the rate of infeed of the veneer sheets.

Other objects and advantages of the present invention will become apparent from the following specification.

SUMMARY OF THE INVENTION

My veneer sorting and stacking machine includes infeed means for feeding veneer sheets of a selected minimum size into the machine; conveying means for moving the sheets through said machine; a plurality of stacking stations located along the conveying means, each station having a pair of stacking bins for serially receiving the veneer sheets; a pluarlity of gate means, operable between two positions at each bin, for diverting, when in the second of such two positions, the veneer sheets from the conveying means into a selected one of the bins; and electric circuit means for selecting a station and a particular bin of that station according to a quality characteristic of the sheet, thereby to operate the appropriate gate means of one of the pair of bins at the selected station.

The infeed means includes a plurality of photoelectric cells which are employed to detect the width of the veneer sheets prior to their entering the machine. When a sheet of suitable size is detected, an endless belt tipple is actuated from a horizontal position to an inclined position such that the veneer sheet passes upward into the machine. Sheets which are too small cause the tipple to revert to or remain in its horizontal position, depositing them onto a scrap conveyor.

Acceptable sheets passed upward by the tipple are received on an inclined conveyor including a pair of aligning belts which correctly position the sheets laterally. The sheets then pass into the main conveying means of the machine which includes an overhead, ribbed endless belt adapted frictionally to engage the top side of the veneer sheets. The under side of the veneer sheets are supported on a pair of guide rails faced with a high density polymer having a very low coefficient of friction.

The infeed portion of the machine is further provided with moisture detecting means to determine if the sheets are sap (wet) or heart (dry). Based on whether the veneer sheet is determined to be wet or dry, its subsequent progress through the machine is determined. If the sheet is wet, it will move along the conveying means until it reaches a first stacking station where it is removed from the conveying means and deposited on a pair of hoist arms. If the veneer sheet is dry, it will bypass the first stacking station and move along the guide rails to a second stacking station.

Each stacking station includes a support means which defines a pair of bins on either side thereof. A chain means is entrained over the support means and is connected to a pair of hoist arms in each bin which are vertically movable with respect to the support means. During any particular period, only one of the bins at each station will be receiving veneer sheets.

When the sheets approach the correct bin, a gate means located along the conveying path is electrically operated to divert them from the conveying means onto a pair of downwardly inclined drop arms. The drop arms receive the sheet and retain it until it comes to rest. The drop arms then discharge the sheet vertically downwardly onto the hoist arms of the selected bin.

Each bin is provided with means for adjusting the hoist arm height so the level at which sheets are received from the drop arms remains substantially constant. The adjustment is accomplished by an air brake which is released when the stack of veneer is too high, thereby allowing the weight of the sheets in the selected bin to lower the hoist arms. The air brake is then reapplied and stacking continues in this manner until the selected bin contains a full stack of sheets. The gate means for that bin is then closed and the gate means of the other bin of the same station is opened to receive subsequent sheets. Thus, when one bin fills, the other bin of the pair begins receiving veneer sheets. As soon as the change from the full to the empty bin occurs, discharge means are activated to remove the stack of sheets from the full bin. The discharged or emptied bin is then available to receive sheets when the second bin becomes full. The alternating of bins continues in this manner so that no accumulator device or off time is necessary.

The machine operation is controlled by circuit which receives an input signal from the moisture detecting means to determine the appropriate stacking station for each sheet. Included in the control circuit are a number of limit switches disposed along the conveyor means which serve as memory or tracing elements. As the sheets move along the conveyor means, the progress of each sheet is detected so that the appropriate gate means is operated at the proper time regardless of the rate of operation of the conveyor or the frequency of sheets fed into the machine.

As a sheet approaches the first stacking station, if it is to be stacked in one of the bins at that station, the control circuit applies a signal to the appropriate gate means. If a veneer sheet is to bypass the first station, a signal is generated closing the gate means of the first station. In an embodiment employing only two stations, the gate means for the last bin remains permanently open inasmuch as any sheet reaching that bin must go into it. In an embodiment wherein three or more stacking stations are employed, it is necessary to include control circuitry to allow a sheet destined for a third or subsequent stacking station to bypass all preceeding stations.

DETAILED DESCRIPTION

General Arrangement

Figures 1, 5:
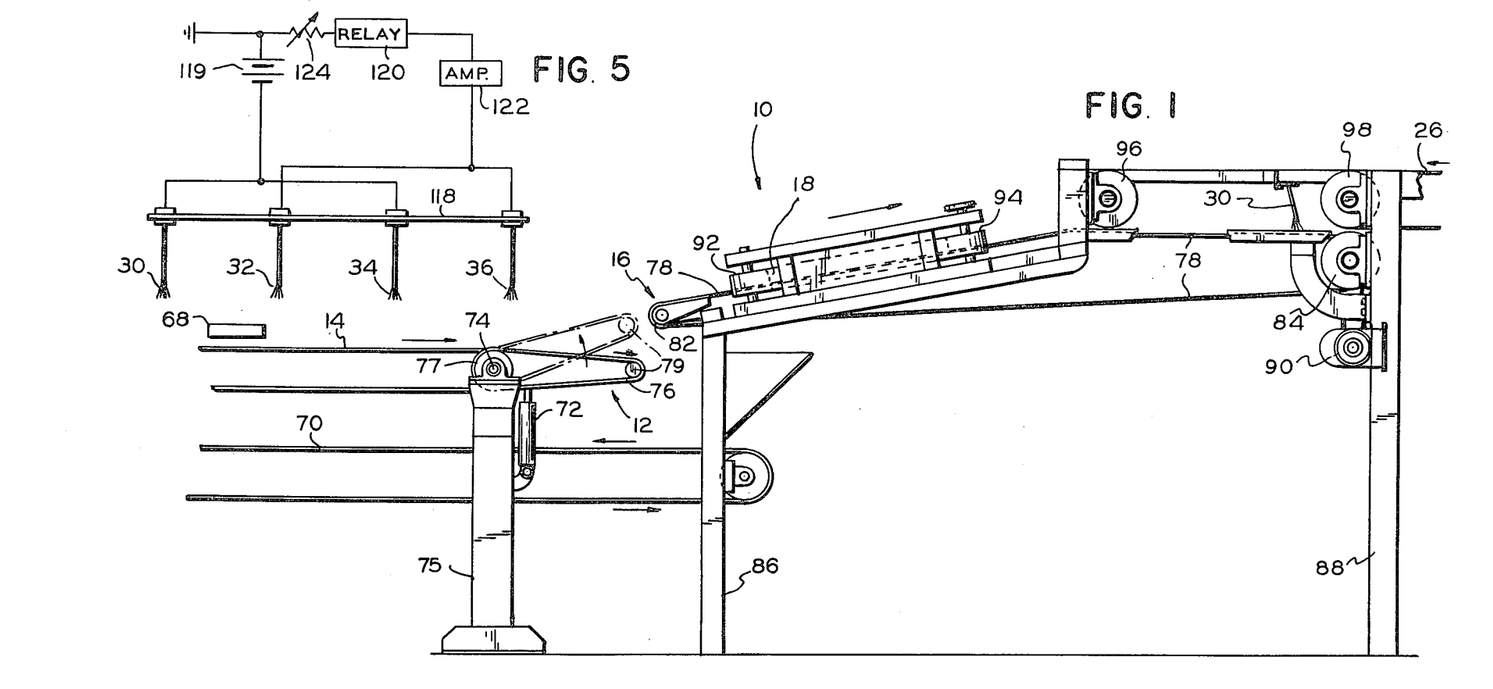
FIG. 1 is a side view of the infeed section of a sorter and stacker according to the present invention.
FIG. 5 is a schematic drawing of the moisture detector and associated circuitry.
Figures 2, 9:
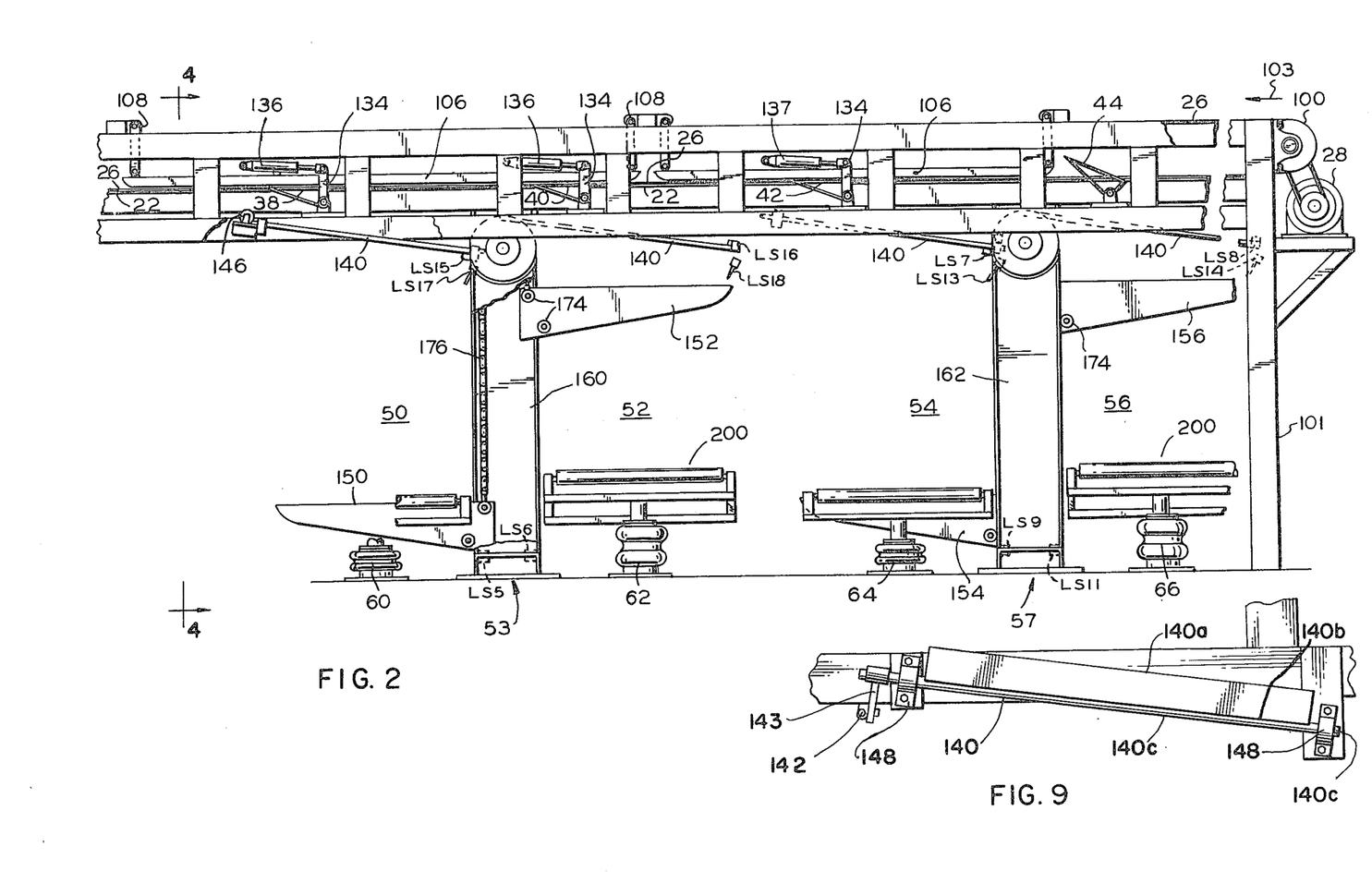
FIG. 2 is a side view of the main section of the sorter and stacker according to a preferred embodiment utilizing two stacking stations.
FIG. 9 is a sectional view taken on line 9—9 of FIG. 3 and illustrating the inclined drop arms to a larger scale.
Figure 3:
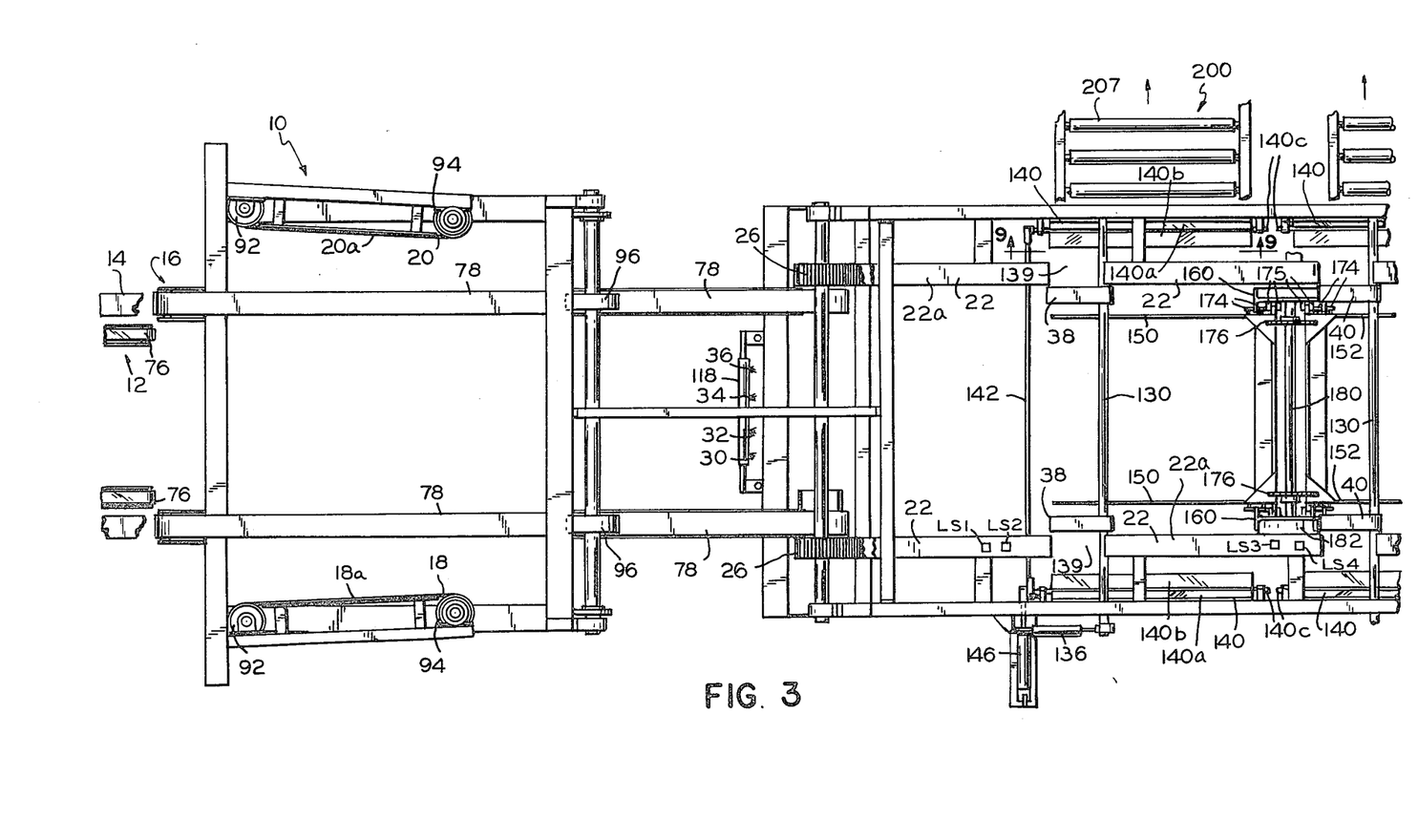
FIG. 3 is a top view of the apparatus showing portions of the infeed and main section.

A preferred embodiment of the machine of the present invention is shown in FIGS. 1, 2 and 3. The machine includes an infeed section 10 which includes an endless belt tipple 12 movable from a horizontal position to an inclined position for feeding veneer sheets carried on a conveyor belt 14 to an inclined conveyor 16. Located on each side of the inclined conveyor 16 are a pair of vertically arranged aligning belts 18 and 20 (FIG. 3).

From the inclined conveyor 16, the veneer sheets pass onto a pair of guide rails 22 faced with a low friction material 104. The sheets are conveyed through the machine on the guide rails 22 by a pair of overhead endless belts 26 driven by a motor 28 located at the end remote from the infeed section 10. As the sheets are conveyed on the rails 22 by the belts 26, they pass under a set of four wire brushes 30, 32, 34 and 36 (FIG. 3). These brushes are electrically wired as shown in FIG. 5. If a veneer sheet passing thereunder is sufficiently wet to permit a current flow between the brushes, a signal is generated designating that sheet as wet (sap). Failure to generate such a signal designates a sheet as dry (heart).

According to the detected characteristic of each sheet, selected gate means 38, 40, 42 or 44 (FIG. 2) will be either in a horizontal or elevated position when the sheet approaches so that the sheet is diverted from the conveying means into a selected one of the stacking bins 50, 52, 54 or 56. The operation of the gate means is indicated by the control circuit shown in FIG. 7.

The bins 50 and 52 constitute a first stacking station 53 and receive only wet sheets, while bins 54 and 56 constitute a second stacking station 57 and receive only dry sheets. Each pair of bins 50, 52 and 54, 56 are arranged to receive sheets alternately. For example, bin 50 receives all the wet sheets until it is full. Switching then takes place and bin 52 receives the wet sheets. After switching, a filled bin is automatically emptied onto a tiltable roller section 200 by one of a series of expanding air mounts 60, 62, 64, 66 to cause the stack of veneer to roll out of the bin. When the second bin of the station is full, switching again occurs and the emptied bin again commences to receive the veneer sheets.

The Stacking Stations

Once a veneer sheet has been engaged by the conveying belt 26, it is pulled along the facing 104 of the rails 22 until it reaches the designated one of stacking stations 53 and 57. As a sheet approaches the stacking station corresponding to its detected characteristic, the appropriate gate means 38, 40, 42 or 44 diverts the sheet from the conveying means.

Figure 4:
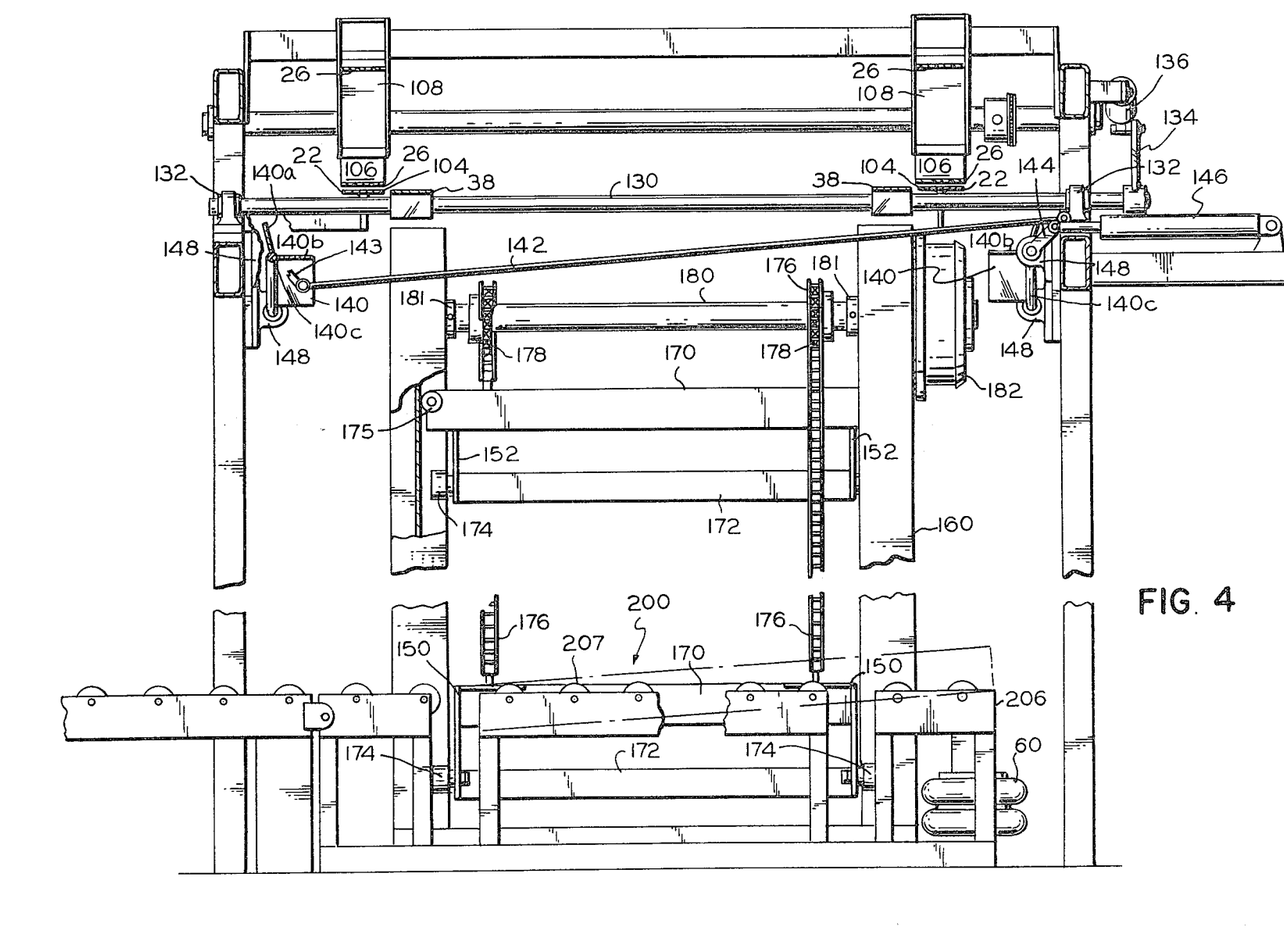
FIG. 4 is a sectional view taken along the line 4—4 of FIG. 2.
Figure 6:
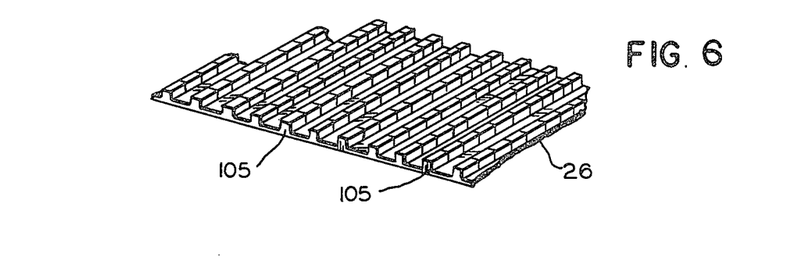
FIG. 6 is a fragmentary perspective view of the overhead endless belt used to convey veneer sheets along the apparatus.

Referring to FIG. 4, the arrangement of gate means 38 is shown in detail. All the gate means, except the last gate means 44, are of similar arrangement. Each gate means comprises a triangular cross-section member positioned along the conveying path just inside of the rails 22. Gate means 38 is mounted on the frame on a rod 130 which is journaled into each end of the frame for rotation in a pair of bearings 132. Attached to the rod 130 at one end thereof is a lever arm 134 connected to an electrically operable air cylinder 136. When activated, the air cylinder 136 extends, causing the arm 134 to rotate the rod 130 thereby to raise the gate means 38 attached thereto.

The air cylinder 136 is actuated by a spring centered double solenoid four-way valve (not shown). It will therefore remain in its last position, either raised or lowered, until operated to a new position. The same is true of the air cylinder for gate means 40. Gate means 42 (FIG. 2), however, has an air cylinder 137 which differs as will be explained subsequently, while gate means 44 requires no air cylinder at all, since it remains in the elevated position at all times.

When in an elevated position, a gate means will divert a veneer sheet downwardly from the guide rails 22. In this regard it should be noted that the guide rails 22 are comprised of segments 22a which have a gap 139 between each segment approximately equal to the length of the gate means (FIG. 3). Thus, when the gate means are in the horizontal position, they serve as a support for the sheets as they pass over the gap 139. When in an elevated position, the gate means serve to remove a veneer sheet from the rails 22 by diverting it downwardly through the gaps 139 in the rails and out of engagement with the belts 26.

A veneer sheet diverted from the conveying means by the action of an elevated gate means, such as gate 38 in FIG. 2, proceeds downwardly onto a pair of drop arms 140. The drop arms are generally L-shaped in cross section, having a normally upstanding guide surface 140a and a receiving surface 140b mounted on a pivotable bar 140c rotatable in bearings 148. Additionally, the arms are inclined downwardly in the downstream direction at an angle substantially equal to the angle at which the sheets are deflected from the conveying means. Thus, a sheet will slide along the surfaces 140b of the arm 140, being guided by the surfaces 140a, until the entire sheet has left the conveying means and is resting on the surfaces 140b of the pair of arms 140.

As best seen in FIG. 4, the drop arms 140 are lined together by a transverse rod 142 which is pivotably connected at one end to a crank 143 and at its opposite end by a lever 144 to an electrically operable air cylinder 146. The other end of the lever 144 is attached to bar 140c which is journaled in bearings 148 in the frame for rotation therein. The drop arms 140 are thus rotated simultaneously from the position shown in FIG. 4, the retaining position, to a releasing position in which the surfaces 140b are generally vertical. In the releasing position, a veneer sheet positioned on the drop arms will be unsupported so that it falls by the force of gravity into the stacking bin.

As will be explained in connection with the control circuitry, each pair of drop arms 140 have a limit switch LS15, LS16, LS7 and LS8, respectively, located at the downstream ends thereof such that they are activated by the sheets only when the sheets rest completely on the drop arms. Activation of the respective switch operates the respective air cylinder 146 causing the rotation of the drop arms 140 from their retaining position to their releasing position. As a sheet falls into the stacking bin, the switch is deactivated and, after an appropriate delay to insure that the sheets clear the drop arms, they reset in preparation for receiving the next sheet.

In this manner the veneer sheets are removed from a conveying system which may operate at speeds of up to 300 feet/minute and are brought to substantially a complete rest on the drop arms. By so doing, the sheets will, when released, fall into the stacking bins with little or no horizontal component of velocity, i.e., the sheets will fall straight down. Such a result is desirable in that it eliminates the need for having any tamping or end straightening devices within the bin area to maintain the edges of the sheets in alignment and thereby simplifies the overall mechanism.

Stacking Hoist

Referring now to FIGS. 2 and 3, it will be seen that beneath each pair of drop arms 140 there are a pair of horizontally extending hoist arms 150, 152, 154 and 156. The hoist arms are located, respectively, in bins 50, 52, 54 and 56, the bins being defined by an H-section stacking station support 160 in the case of station 53 and 162 in the case of station 57. Since both of the stacking stations 53 and 57 shown in FIG. 2 are constructed substantially identically, for simplicity it is necessary only to describe the structure of stacking station 53, including bins 50 and 52.

The hoist arms 150, 152 are arranged for vertical reciprocal movement with respect to their support 160. As shown in FIG. 4, each pair of hoist arms are connected by cross braces 170 and 172. Mounted in the cross braces are roller bearings 174 which permit the arms 150, 152 to move smoothly up and down the flanges of support 160. Side thrust rollers 175 are provided to contact the web of the support.

The hoist arm pairs 150 and 152 are interconnected by chains 176 (FIGS. 2 and 4) attached to each arm assembly and entrained over a pair of chain sprockets 178 mounted for rotation on a shaft 180. The hoist arm pairs 150 and 152 are thus operatively interconnected in a teeter-totter like fashion. As the hoist arm pair 150 is raised on the support 160, the pair 152 will be lowered, and vice versa.

The sprocket shaft 180 is journaled in the support 160 at each side thereof and mounted in bearings 181. An air brake 182 is mounted at one end of the shaft 180 for controlling the rotation of the shaft. The air brake 182 is of a standard pancake type widely available. One suitable for the purpose provides 4,300 in.-lbs. of torque and is manufactured by Horton Manufacturing Co., Minneapolis, Minnesota, under the trademark AIR-CHAMP. The shaft 180 extends through an aperture provided in the brake. When activated, the brake prevents rotation of the shaft.

Considering the operation of the hoist arm assembly, it will be apparent that if bin 52 is receiving wet veneer sheets via gate means 40 and drop arms 140, the sheets will be deposited on the hoist arms 152. As successive sheets are deposited on the arms 152, the interconnection of the pairs 150 and 152 cause the hoist arms 152 to move downwardly due to the weight of the sheets and the hoist arms 150 to move correspondingly upwardly. Such action is selectively prevented by the air brake 182.

When a stack of sheets on the arms 152 reaches a selected height, the brake 182 is released. The releasing is accomplished by the accumulated veneer sheets reaching a height sufficient to strike a limit switch as will be hereinafter described. When operated, the limit switch releases the air brake 182 allowing the weight of the veneer sheets on the arms 152 to move them downwardly until the limit switch is opened. The brake 182 is then reapplied again to prevent movement of the hoist arms. In this manner, the sheet receiving level of a bin is automatically maintained within a selected range without motorized equipment.

As is best seen from FIG. 4, when the hoist arms 150, for example, reach the bottom of support 160, the bottom sheet of the stack will contact a tiltable roller section 200. Similar roller sections are located in the bottom of each bin with provision made to accommodate the respective pair of hoist arms. In a first position, the roller sections 200 are horizontally disposed as shown. When a hoist arm pair reaches the bottom of its permissible travel, its lower cross brace 172 actuates a respective one of the limit switches, LS5, LS6, LS9 and LS11. These switches each operate a respective rubber diaphragmed air cylinder or air mount 60, 62, 64 and 66. These air cylinders or air mounts are of known construction and, for example, a Firestone Air Mount has been found satisfactory for this purpose. Cylinder 60, when expanded, lifts the end 206 of the roller section 200 vertically upwardly a distance of approximately 3 inches above its horizontal position, as shown in phantom in FIG. 4.

As the roller section 200 rises, it lifts the veneer stack by an amount sufficient to clear the hoist arms 150 and to initiate movement of the stack down inclined rollers 207. In this manner, a full stack is removed from each bin as soon as the hoist arms operate the respective limit switch LS5, LS6, LS9 or LS11. A signal from the respective switch is also utilized to change the stacking operation from the full bin to the other bin of the pair, as will be more fully explained hereinafter.

CONTROL CIRCUIT AND MACHINE OPERATION

Figure 7:
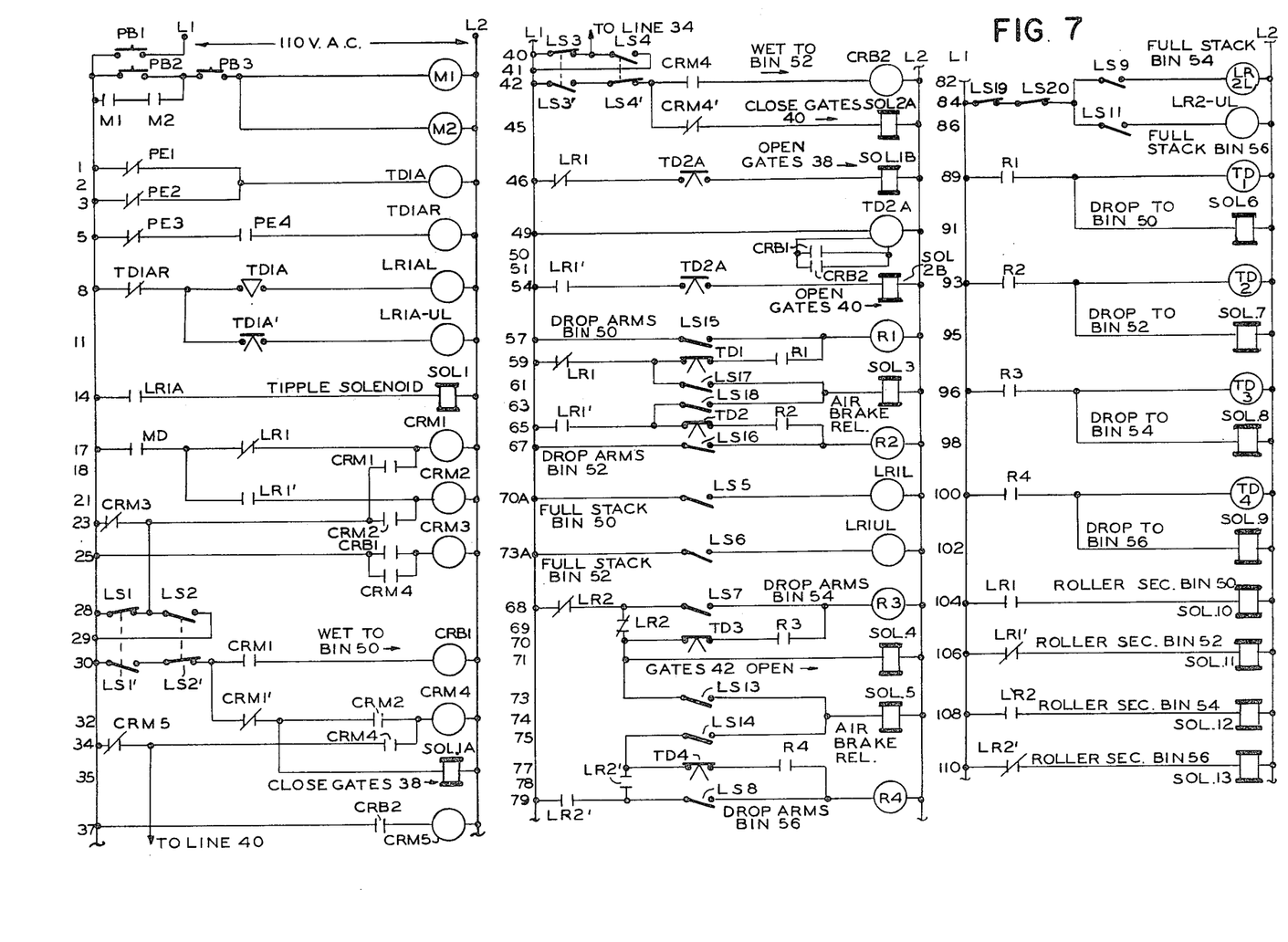
FIG. 7 is a diagram of the control circuit of the illustrated embodiment.
Figure 8:
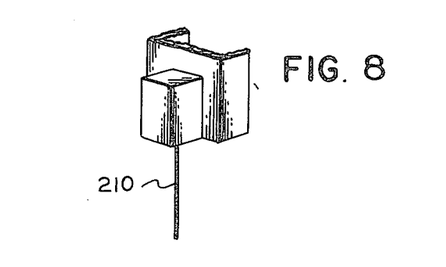
FIG. 8 is a side view of the limit switches employed in the apparatus.

The control circuitry for the apparatus is disclosed in FIG. 7.

Turning now to the stacking station circuitry, the operation of the drop arms 140 will be considered. Located at the lower end of the drop arms are limit switches LS15, LS16, LS7 and LS8 corresponding, respectively, to bins 50, 52, 54 and 56. When a veneer sheet is diverted downward by a gate means, it passes onto the drop arms in the manner previously described. When the sheet is fully disposed on the drop arms, its leading end strikes one of the limit switches LS15, LS16, LS7 or LS8, activating the corresponding pair of drop arms.

FIG. 7, line 57, shows the circuitry for bin 50. When LS15 is closed, it completes a circuit to relay R1 having contacts on lines 59 and 89. When R1 is operated, its contacts on line 89 close, energizing time delay relay TD1 and solenoid SOL6 on line 91. SOL6 actuates air cylinder 146 (FIG. 4) causing the drop arms 140 to rotate from their retaining position to their releasing position. The time delay relay TD1 seals in relay R1 by its contacts on line 59 to insure that the veneer sheet has dropped clear of the arms 140 before allowing contacts R1 on line 89 to open. When deenergized, the drop arms return to their initial position. The drop arm operation described is identical for all bins, the specific circuitry for each bin being identified in FIG. 7.

Stacking Hoist Circuitry

Referring now to FIGS. 2 and 7, the alternating operation of the stacking pins 50 and 52 and the associated control circuitry will be described. Assuming an initial operating state wherein bin 50 is utilized for stacking wet veneer sheets, the hoist arms 150 will initially be located at the top of the support 160 while hoist arms 152 will be at the bottom. This is just opposite of the positions shown in FIG. 2. As sheets enter the conveying means, the wet ones are diverted by gate means 38 onto the drop arms 140 of bin 50. The drop arms 140 deposit the sheets onto the hoist arms 150. As the sheets accumulate on arms 150, the height of the stack will rise until a limit switch LS17 is operated. LS17 is suspended from the frame of the machine and is positioned to be operated when the stack of sheets reaches a selected height.

When LS17 is operated, a circuit is completed on line 61 (FIG. 7) to a solenoid SOL3 which controls the air supply for the air brake 182 of FIG. 4. Operating LS17 releases the air brake and allows the weight of the veneer sheets on the arms 150 to lower them. This causes the empty hoist arms 152 in bin 52 to rise. As soon as the arms 150 have dropped a distance sufficient to let the limit switch 17 clear the stack, the circuit opens to reestablish braking action by the air brake 182. However, there is a mechanical delay built into the braking operation which is desirably utilized so that each additional veneer sheet does not cause the air brake to be released and reapplied. It takes approximately 4 to 6 sheets deposited on a pair of hoist arms before a height adjustment will occur.

After a period of operation, the stacking arms 150 will reach the bottom of support 160 indicating that they contain a full stack of wet sheets. Mounted on the support means 160 near the bottom is the limit switch LS5 which is operated by the brace 172 when the arms 150 reach the bottom of the support 160. When closed, LS5 completes a circuit on line 70A to the latch relay LR1L. Operation of this relay reverses the normal state of contacts LR1 and LR1' on lines 17 and 21 so that LR1' becomes normally closed while LR1 becomes normally open. This results in transferring the stacking operation from bin 50 to bin 52. Relay LR1L further operates the air cylinder 60 for raising the roller section 200 by operating solenoid SOL10 on line 104. In addition, operation of LR1L closes contact LR1' on line 65 to preset limit switch LS18 for controlling the air brake when the stack height in bin 22 requires adjustment.

It will now be apparent that once the hoist arms 150 reach the bottom, the stacking operation switches from bin 50 to bin 52 while the full stack of veneer sheets is removed from bin 50 by operation of the roller section 200. Stacking then continues in bin 52 until it is full, at which point the stacking operation switches back to bin 50, which, having been emptied, is again ready to receive wet sheets.

To accomplish return switching, bin 52 is provided with a limit switch LS6, located next to LS5 on the support 160 and adapted to be engaged by the respective cross brace for arms 152 when they are in their lowermost position. When bin 52 is full and LS6 is closed, unlatching relay LR1UL on line 73A is operated. This unlatching relay reverts operation of the stacking back to the bin 50 by again reversing the normal state of the contacts LR1 and LR1' on lines 17 and 21. It also causes bin 52 to be emptied in the same manner as described for bin 50. The stacking at station 53 continues in this manner with the bins alternately receiving the wet veneer sheets.

A dry veneer sheet having passed the wet stacking station 53 continues on toward gate means 42 of bin 54. In the illustrated embodiment with only two stacking stations, all veneer sheets approaching the second stacking station 57 must go into one of the bins 54 and 56. Thus, the circuitry required for operating the second or dry station 57 is considerably simpler than that required for the first stacking station. For example, it will be apparent that if a dry veneer sheet does not enter bin 54, it must enter bin 56. Accordingly, in this embodiment gate means 44 is always maintained in an elevated position and requires no actuating circuitry or air cylinder. Gate means 42 is operated by the air cylinder 137. However, this cylinder is dissimilar from cylinders 136 used to operate gate means 38 and 40. Cylinder 137 is a one-way spring biased cylinder, which keeps gate means 42 normally closed unless operated.

Considering the circuitry at lines 68–75 of FIG. 7, the operation of gate means 42 will be explained. When bin 54 is to receive the dry sheets, the contacts LR2 on lines 68 and 69 are closed. This operates the one-way cylinder 137 by means of solenoid SOL4 on line 71. This solenoid maintains gate means 42 in its elevated position as long as the LR2 contacts are closed.

When the hoist arms 154 of bin 54 reach the bottom, a limit switch LS9 is operated for switching operation to bin 56. This closes contact LS9 on line 82. In series with LS9 are limit switches LS19 and LS20 which are normally closed. As a dry sheet approaches gate means 42, it strikes limit switches LS19 and LS20 opening their contacts on line 84. This prevents the operation of latch relay LR2L if a veneer sheet is close enough to gate means 42 to be possibly caught by its closing. If no sheet is present or when a sheet has passed, the circuit is closed to operate relay LR2L on line 82. Operation of this relay causes its contacts to change their normal state. Contacts LR2 on lines 68 and 69 become normally open and the contacts LR2' on lines 78 and 79 become normally closed. When this occurs, solenoid SOL4 becomes inoperative and gate means 42 is closed by the spring offset of cylinder 137.

In addition to switching the stacking operation from bin 54 to bin 56, latch relay LR2L also operates the air cylinder 64 and respective roller section 200 for discharging the full stack. Subsequent dry sheets are received in bin 56 and stacked on hoist arms 156. As will be apparent, the stacking operation reverts back to bin 54 when bin 56 is full and limit switch LS11 is actuated causing the relay LR2UL on line 86 to be operated. Again this switching cannot occur if a sheet is near the gate means 42 since limit switch LS19 and/or LS20 will be open.

Operational Summary

While it is believed that the foregoing detailed specification, taken in connection with the accompanying drawings, completely and accurately describes the structure and operation of the preferred embodiment, a brief summary of the machine operation will now be given.

A veneer sheet enters the stacking machine, if it is determined by photoelectric means, to be of a minimum width. Such sheets are received into the machine on an inclined endless belt conveyor 16 from a tipple 12. The sheets pass under a moisture detecting circuit employing a set of wire brushes 30, 32, 34 and 36 which attempt to pass current through the veneer sheets. Wood normally being a poor conductor of electricity will not pass current unless it is wet.

In the event that a current does flow through the sheet indicating a preset degree of wetness, a pair of contacts MD are closed which set control circuitry so that the sheet will be routed to one of the bins 50 or 52 of the first stacking station 53. When either of the bins 50, 52 of the first stacking station 53 become filled, a latch relay LR1L or LR1UL is operated causing the gate means associated with the full bin to close and the gate means associated with the other bin at that stacking station to open.

In the event that a dry sheet is detected, the gate means of both bins of the first stacking station 53 are closed and the sheet is conveyed on the guide rails 22 to the second stacking station 57 where it will pass into either bin 54 or 56.

While the above constitutes a preferred embodiment of the present invention, as hereinabove mentioned it is possible to provide a sorting and stacking machine which will sort dry veneer sheets according to grade depending upon an information signal supplied by a human grader positioned near the infeed portion of the stacking machine. For such an operation, three or more stacking stations are desirable. This necessitates additional circuitry for the second and subsequent stacking stations similar to that provided for the first stacking station to close the gate means for sheets which are to bypass the respective station. In view of the explanation of the circuitry given herein, such modifications for intermediate stacking stations will be obvious to the artisan and a discussion thereof will thus not be included.

I claim:

1. In a veneer sorting and stacking machine having means for conveying veneer sheet along a path of travel directed longitudinally of said machine,
   a pair of bins for alternately receiving veneer sheets from said machine, said bins being disposed adjacent each other along said path of travel of said veneer sheets;
   means for feeding veneer sheets to a selected one of said pair of bins;
   veritical support means positioned intermediate said pair of bins and on either side thereof;
   a pair of hoist arms diposed in each of said bins, said arms being supported by and vertically movable with respect to said support means, said hoist arms being disposed parallel to said path of travel of said veneer sheets for receiving veneer sheets fed to said selected one of said pair of bins;
   means for depositing said veneer sheets on said pair of hoist arms in said selected one of said pair of bins;
   chain means entrained over said support means for movably connecting said hoist arm pairs so that as one pair of hoist arms in said selected one of said pair of bins is lowered, the other pair of hoist arms is raised in the other of said pair of bins;

said pairs of hoist arms being gravity operated by the weight of veneer sheets deposited on said pair of hoist arms in said selected one of said pair of bins; and brake means mounted on said support means for selectively preventing movement of said hoist arm pairs.

2. The machine of claim 1 further including circuit means for releasing said brake means when a stack of veneer sheets on a pair of hoist arms reaches a selected height and for reapplying said brake means when said pair of hoist arms have dropped a desired distance below said height.

3. The machine of claim 2 further comprising:

means for detecting when said selected one of said pair of bins is full;

means for removing a full stack of sheets from said selected one of said pair of bins when detected by said detecting means, said removing means comprising tiltable roller means disposed between said pair of hoist arms and adapted to move said stack of sheets transversely of said longitudinal path of travel and out of said selected one of said pair of bins, said tiltable roller means being adapted to clear said pair of hoist arms when in its tilted position; and means for causing stacking of said veneer sheets to be switched to said other of said pair of bins when said full stack is detected.

4. The machine of claim 1 in which said means for depositing said veneer sheets comprise a pair of drop arms disposed in each of said pair of bins, said drop arms being positioned adjacent the sides of said bins, said drop arms being inclined downwardly from said path of travel of said veneer sheets at an angle substantially equal to the angle at which said veneer sheets are fed to said selected one of said pair of bins, each of said drop arms being adapted to receive a lateral edge of a veneer sheet as it is fed thereto, each of said drop arms comprising a generally L-shaped member having a normally upstanding guide surface and a veneer sheet edge receiving surface; and means simultaneously to rotate each of said pair of drop arms about a longitudinal axis therethrough only when a veneer sheet is fully supported on said veneer sheet edge receiving surfaces thereof, whereby said veneer sheet will be released vertically to fall onto said pair of hoist arms in said selected one of said pair of bins with substantially no horizontal velocity.

* * * * *

UNITED STATES PATENT OFFICE
CERTIFICATE OF CORRECTION

PATENT NO. : 3,912,254
DATED : October 14, 1975
INVENTOR(S) : CURTIS H. WOODRUFF It is certified that error appears in the above-identified patent and that said Letters Patent are hereby corrected as shown below:

Column 1, line 2, "continuation" should be --division--;

Column 1, line 10, "One" should be --Due--;

Column 2, line 7, after "of" insert --a--;

Column 3, line 30, after "by" insert --a--;

Column 5, line 47, "arm" should be --arms--;

Column 5, line 51, "lined" should be --linked--;

Column 8, line 8, "pins" should be --bins--; and

Column 10, line 44, "sheet" should be --sheets--.

Signed and Sealed this thirteenth Day of January 1976

[SEAL]

Attest:

RUTH C. MASON
*Attesting Officer*

C. MARSHALL DANN
*Commissioner of Patents and Trademarks*